(12) United States Patent
Thomas et al.

(10) Patent No.: US 11,379,754 B2
(45) Date of Patent: Jul. 5, 2022

(54) ENTITY RESOLUTION INCORPORATING DATA FROM VARIOUS DATA SOURCES WHICH USES TOKENS AND NORMALIZES RECORDS

(71) Applicant: Microsoft Technology Licensing, LLC, Redmond, WA (US)

(72) Inventors: Satish J. Thomas, Sammamish, WA (US); Murtaza Muidul Huda Chowdhury, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1158 days.

(21) Appl. No.: 15/911,479

(22) Filed: Mar. 5, 2018

(65) Prior Publication Data

US 2018/0197113 A1 Jul. 12, 2018

Related U.S. Application Data

(63) Continuation of application No. 14/457,317, filed on Aug. 12, 2014, now Pat. No. 9,922,290.

(51) Int. Cl.
*G06N 20/00* (2019.01)
*G06F 17/16* (2006.01)
(Continued)

(52) U.S. Cl.
CPC .......... *G06N 20/00* (2019.01); *G06F 16/215* (2019.01); *G06F 16/334* (2019.01);
(Continued)

(58) Field of Classification Search
None
See application file for complete search history.

(56) References Cited

U.S. PATENT DOCUMENTS

| 8,175,873 B2 | 5/2012 | Di Fabbrizio et al. |
| 8,370,366 B2 | 2/2013 | Adams et al. |

(Continued)

FOREIGN PATENT DOCUMENTS

WO 2013013942 A1 1/2013

OTHER PUBLICATIONS

"Summon to Attend Oral Proceedings Issued in European Patent Application No. 15750903.5", Mailed Date: Oct. 24. 2019, 11 Pages.

(Continued)

*Primary Examiner* — David R Vincent
(74) *Attorney, Agent, or Firm* — Christopher J. Volkmann; Kelly, Holt & Christenson, PLLC

(57) ABSTRACT

A pair of records is tokenized to form a normalized representation of an entity represented by each record. The tokens are correlated to a machine learning system by determining whether a learned resolution already exists for the two entities. If not, the normalized records are compared to generate a comparison measure to determine whether the records match. The normalized records can also be used to perform a web search and web search results can be normalized and used as additional records for matching. When a match is found, the records are updated to indicate that they match, and the match is provided to the machine learning system to update the learned resolutions.

18 Claims, 10 Drawing Sheets

(51) Int. Cl.
*G06F 16/33* (2019.01)
*G06F 16/951* (2019.01)
*G06Q 10/10* (2012.01)
*G06Q 30/00* (2012.01)
*G06F 16/215* (2019.01)
*G06F 40/284* (2020.01)

(52) U.S. Cl.
CPC ............ *G06F 16/951* (2019.01); *G06F 17/16* (2013.01); *G06F 40/284* (2020.01); *G06Q 10/10* (2013.01); *G06Q 30/01* (2013.01)

(56) References Cited

U.S. PATENT DOCUMENTS

| | | |
|---|---|---|
| 8,423,525 B2 | 4/2013 | Jonas |
| 8,595,219 B1 | 11/2013 | Thompson |
| 8,620,927 B2 | 12/2013 | Jonas |
| 8,731,901 B2 | 5/2014 | Srihari et al. |
| 9,547,682 B2 | 1/2017 | Chaney et al. |
| 9,613,166 B2 | 4/2017 | Lightner et al. |
| 9,652,513 B2 | 5/2017 | Anderson |
| 2004/0249789 A1 | 12/2004 | Kapoor et al. |
| 2008/0040342 A1 | 2/2008 | Hust et al. |
| 2009/0198678 A1 | 8/2009 | Conrad et al. |
| 2010/0082333 A1* | 4/2010 | Al-Shammari ....... G06F 40/242 704/10 |
| 2010/0198756 A1 | 8/2010 | Zhang et al. |
| 2013/0054598 A1 | 2/2013 | Caceres |
| 2013/0124524 A1 | 5/2013 | Anderson |
| 2013/0173639 A1 | 7/2013 | Chandra et al. |
| 2013/0185306 A1 | 7/2013 | Botros |
| 2013/0268526 A1* | 10/2013 | Johns .................... G06F 16/954 707/730 |
| 2014/0172754 A1 | 6/2014 | He et al. |
| 2014/0279739 A1 | 9/2014 | Elkington et al. |
| 2015/0019463 A1* | 1/2015 | Simard ................. H04L 1/0079 706/12 |
| 2015/0228004 A1 | 8/2015 | Bednarek et al. |

OTHER PUBLICATIONS

"Understanding Suspect Duplicate Processing for Party Data", Retrieved from: https://www.ibm.com/support/knowledgecenter/en/SSWSR9_10.1.0/com.IBM.mdmhs.dev.party.doc/concepts/c_suspectduplicateprocessingforparty.html, Sep. 4, 2012, 3 Pages.

"Non Final Office Action Issued in U.S. Appl. No. 14/457,317", dated Mar. 9, 2017, 20 Pages.

"Office Action Issued in European Patent Application No. 15750903.5", dated Sep. 14, 2018, 9 Pages.

Brizan, "A Survey of Entity Resolution and Record Linkage Methadologies", In Communications of the IIMA, vol. 6, Issue 3, Jul. 24, 2014, 10 Pages.

Kolb, et al., "Learning-based Entity Resolution with MapReduce", In Proceedings of the Third International Workshop on Cloud Data Management, Oct. 28, 2011, 6 Pages.

Lee, at al., "Cleansing Data for Mining and Warehousing", In the Proceedings of Third International Conference Security in Communication, Sep. 11, 2002, 10 Pages.

Minton, et al., "A Heterogeneous Field Matching Method for Record Linkage", In the Proceedings of Fifth IEEE International Conference On Data Mining, Nov. 27, 2005, 8 Pages.

Nambiar, et al., "Data Augmentation as a Service for Single View Creation", In the Proceedings of IEEE International Conference on Services Computing, Jul. 4, 2011, 8 Pages.

"International Preliminary Report on Patentability Issued in PCT Application No. PCT/US2015/044543", dated Nov. 22, 2016, 9 Pages.

"International Search Report & Written Opinion Received For PCT Application No. PCT/US2015/044543", dated Oct. 2, 2015, 11 Pages.

"Second Written Opinion Issued in PCT Application No. PCT/US2015/044543", dated Aug. 2, 2016, 8 Pages.

Prasad, et al., "Data Cleansing Techniques for Large Enterprise Datasets", In Proceedings of the Annual SRII Globe Conference, Apr. 2, 2011, 10 Pages.

"Office Action Issued in Chinese Patent Application No. 201580043264.8", dated Jul. 31, 2020, 8 Pages.

"First Office Action Issued, in Chinese Patent Application No. 201580043264.8", dated Jul. 26, 2019. 26 Pages.

"Second Office Action Issued in Chinese Patent Application No. 201580043264.8", dated Apr. 21, 2020, 25 Pages.

\* cited by examiner

ENTITY RESOLUTION INCORPORATING DATA FROM VARIOUS DATA SOURCES WHICH USES TOKENS AND NORMALIZES RECORDS

CROSS-REFERENCE TO RELATED APPLICATION

The present application is a continuation of and claims priority of U.S. patent application Ser. No. 14/457,317, filed Aug. 12, 2014, the content of which is hereby incorporated by reference in its entirety.

BACKGROUND

An organization may use one or more computer systems. The different computer systems may be used for different purposes, by different people, and therefore each system may contain its own data.

Some such computer systems include business systems. Business systems can include, for instance, customer relations management (CRM) systems, enterprise resource planning (ERP) systems, line-of-business (LOB) systems, among others. These systems can store data records (such as entities) that represent items within the business system, and they can run business processes, workflows, or other business logic on the data records so that users can perform the tasks or activities in order to carry out the function of the business.

Entities can represent a wide variety of different types of things within a business system. They can be objects with callable functions, or they can be even more rich structures. In addition, they can represent a wide variety of different types of things. For instance, a customer entity can represent and describe a customer. A vendor entity can represent and describe a vendor. A product entity can represent and describe a product. A quote entity can represent and describe a quote. A business opportunity entity can represent and describe a business opportunity. These are examples only, and a wide variety of other entities can be used as well.

The data (e.g., entities or other business records) or other information can exist in disparate applications sourced for different business functions. Some of those functions can include, for instance, sales, marketing, customer service, e-commerce, among others. Because each of these different applications or systems has its own data, the data for a single entity may be different, depending upon the application in which it is used. For instance, the data representing customer A in a sales system may be different from the data representing customer A in a licensing system. In fact, it is not uncommon for these types of different representations to exist in many (perhaps 40-50 or more) different systems for a single enterprise or organization. This can present certain challenges.

For instance, it may be that a person from customer A contacts a customer service representative for an organization. The customer service representative may reside in some country where customer A does not have a large presence, and may not know that customer A is the organization's highest paying customer, because that information is stored in a sales system, while the customer service representative is using a customer service system. However, this type of information could be very useful to the customer service representative.

The problem can be exacerbated because many organizations have complicated relationships with one another. For instance, customer A may have a financial relationship with the organization, as well as a contractual or transactional relationship. The information needed in the financial relationship may be different from the information needed in the contractual relationship. Similarly, customer A may have certain usage patterns with the organization that are not captured in either the financial or contractual contexts. In some cases, customer A may be both a customer and a vendor of the same organization. All of these types of complicated relationships can make it even more difficult to understand, in a comprehensive sense, how customer A relates to the organization that deploys the business system.

Some work has been done in the area of entity resolution. This work has included attempts to perform object matching, duplicate identification, among other things. These entity resolution tasks are used in an attempt to identify different entities in the computer system that may be referring to the same real-world item. For instance, where a customer has a legal name of "ACME, Inc." that term may be used to identify the customer in the licensing system. However, where the customer also has a different (e.g., popular) name, such as "The ACME Company", that phrase may be used to identify the customer in the sales or customer service systems. Current work that is being done to perform entity resolution includes rule-based methods, pair-wise classification, various clustering approaches and different forms of probabilistic inference.

The discussion above is merely provided for general background information and is not intended to be used as an aid in determining the scope of the claimed subject matter.

SUMMARY

A pair of records is tokenized to form a normalized representation of an entity represented by each record. The tokens are correlated to a machine learning system by determining whether a learned resolution already exists for the two entities. If not, the normalized records are compared to generate a comparison measure to determine whether the records match. The normalized records can also be used to perform a web search and web search results can be normalized and used as additional records for matching. When a match is found, the records are updated to indicate that they match, and the match is provided to the machine learning system to update the learned resolutions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
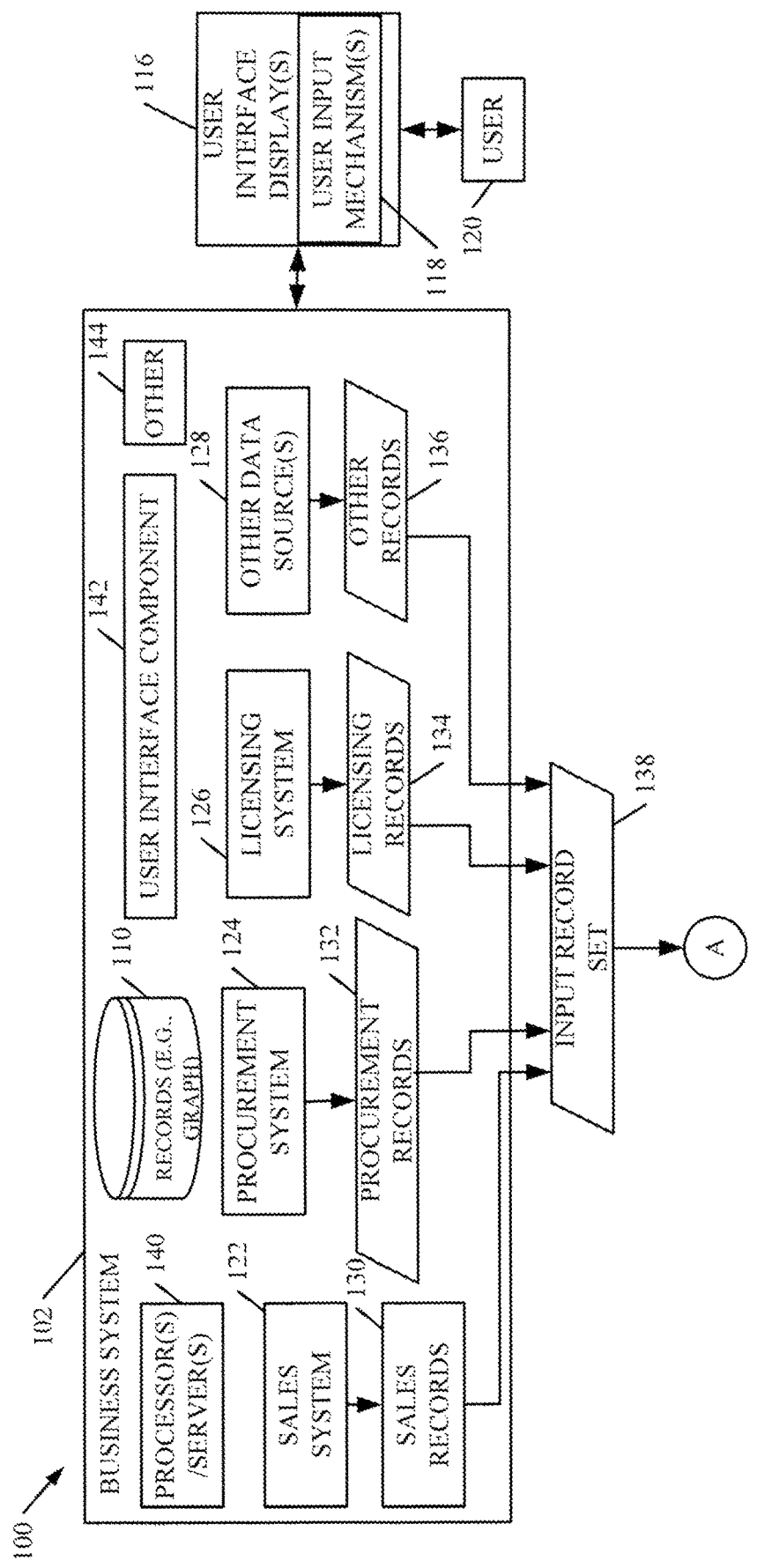
FIGS. 1A and 1B (collectively referred to as FIG. 1) show a block diagram of one example of an entity resolution architecture.
Figure 1B:
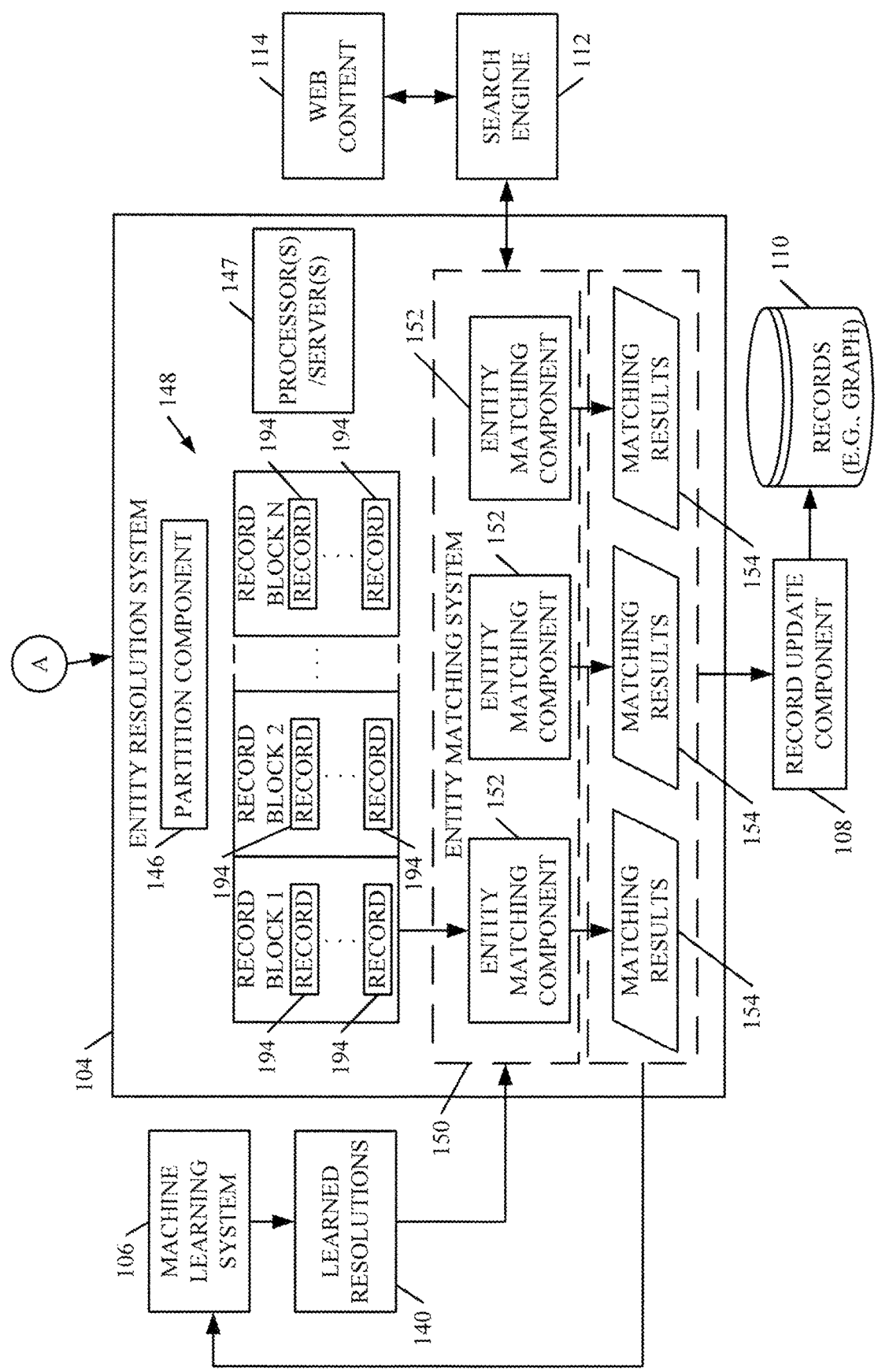

The present discussion will proceed with respect to entity resolution of customer entities. For instance, there may be two different entities in a computing system, both of which represent the same customer. However, the two different entities may include slightly different (or even vastly different) information. The present discussion will proceed with respect to a description of how the two customer entities can be resolved and identified as actually referring to the same customer. It will be appreciated, of course, that the entity resolution can be performed on any types of entities in a computer system, and the customer entity is only one example. FIG. 1 is a block diagram of one example of an entity resolution architecture 100. Architecture 100 illustratively includes business system 102, entity resolution system 104 (which is shown separate from business system 102, but which can be part of business system 102 as well), machine learning system 106, record update component 108, a set of records (e.g., a graph of entity nodes connected by relationship connections) 110, a search engine 112 that accesses web content 114, processors or servers 140, user interface components 142, and it can include other items 144 as well. Architecture 100 also shows that, in one example, business system 102 generates user interface displays 116 with user input mechanisms 118 that can be accessed for interaction by user 120. User 120 can illustratively interact with the user input mechanisms 118 in order to control and manipulate business system 102. Architecture 100 also illustrates that, in one example, the records 110 can also be stored in, or otherwise accessible by, business system 102. Therefore, user 120 can illustratively perform a search against records 110 in order to get a comprehensive view of the various entities and relationships within business system 102.

Business system 102 can illustratively include a sales system 122, procurement system 124, licensing system 126, and it can include other data sources 128. Sales system 122 can be used by sales users to conduct sales activities. Procurement system 124 can be used by users to conduct procurement activities. Licensing system 126 can be used to perform licensing activities. All of these activities can be performed with respect to the organization that is using business system 102. These types of activities can be performed by a variety of different users.

In addition, each system 122-128 can have its own data representing the various other organizations, individuals, products, etc. (e.g., the entities) that interact with the organization that deploys business system 102. For instance, sales system 122 may have customer data that represents the sales customers of the organization that deploys business system 102. The sales customers are illustratively represented by a customer entity within the sales system 122. The customer entity in sales system 122 may describe the contacts, address, and other information for the customer in the sales context.

At the same time, the organization that uses business system 102 may also have licensing agreements with the same customer. In that case, licensing system 126 illustratively includes an entity that represents the customer, in the licensing context. Therefore, the contacts, relationship information and other information corresponding to the customer entity in the licensing system 126 may be different than that for the same customer in sales system 122.

By way of example, the customer information for the customer entity in sales system 110 may include a gross annual sales number for the given consumer, indicating how large the customer is with respect to the organization deploying system 102. It may also include a customer name that is a popular name, instead of the customer's legal name. However, licensing system 126 may not have that same type of information. Instead, the entity representing the customer in licensing system 126 may have the customer's legal name and may have other information related to licensing. Therefore, a user 120 who is in contact with the customer through licensing system 126 may have no idea that the customer is a very large customer of the organization, because that information is in sales system 122.

Before describing the system in more detail, an overview of some portions of the system will first be provided. In one example, sales records 130 (including the entities from sales system 122), procurement records 132 (including the entities from procurement system 124), licensing records 134 (including the entities from licensing system 126) and other records 136 (including the entities from other data sources 128) are illustratively output as a record set 138 that is provided to entity resolution system 104. Entity resolution system 104 illustratively resolves the various entities to identify which entities in the set of input records 138 from business system 102 actually refer to the same customer. They can do this by correlating the records to previously learned resolutions 140, and using search results from search engine 112 that searches web content 114. The results of the entity resolution are provided to record update component 108 that updates the records 110 (e.g., a graph of related entities) 110. The records 110 can also be stored within, or accessible by, business system 102. Therefore, when user 120 accesses records 110 to obtain a customer entity for a given customer, the user illustratively obtains a comprehensive view for that customer, because the customer entity in records 110 will include all of the information for that customer from the various entity representations of that customer in the various systems and data sources 122-128.

Entity resolution system 104, itself, illustratively includes partition component 146 that partitions the input record set 138 into a set of blocks 148. System 104 also illustratively includes processors or servers 147 and an entity matching system 150 that includes a plurality of different instances of entity matching components 152. Each instance of an entity matching component 152 operates on a separate record block 148 and identifies records within that record block that are referring to the same customer. Each entity matching component 152 provides a set of matching results 154 that indicate which of the records actually match and refer to the same entity, and which do not. The match results 154 are illustratively provided to machine learning system 106 which uses them to update learned resolutions 140. Match results 154 are also provided to record update component 108. Record update component 108 then obtains all of the information from both of the matching records and updates records 110 so that the entity node in the graph contains a superset of the information from both records that were just analyzed. Next time a user 120 accesses that node, the user will thus have a more comprehensive view of the node (e.g., the customer).

Figure 2:
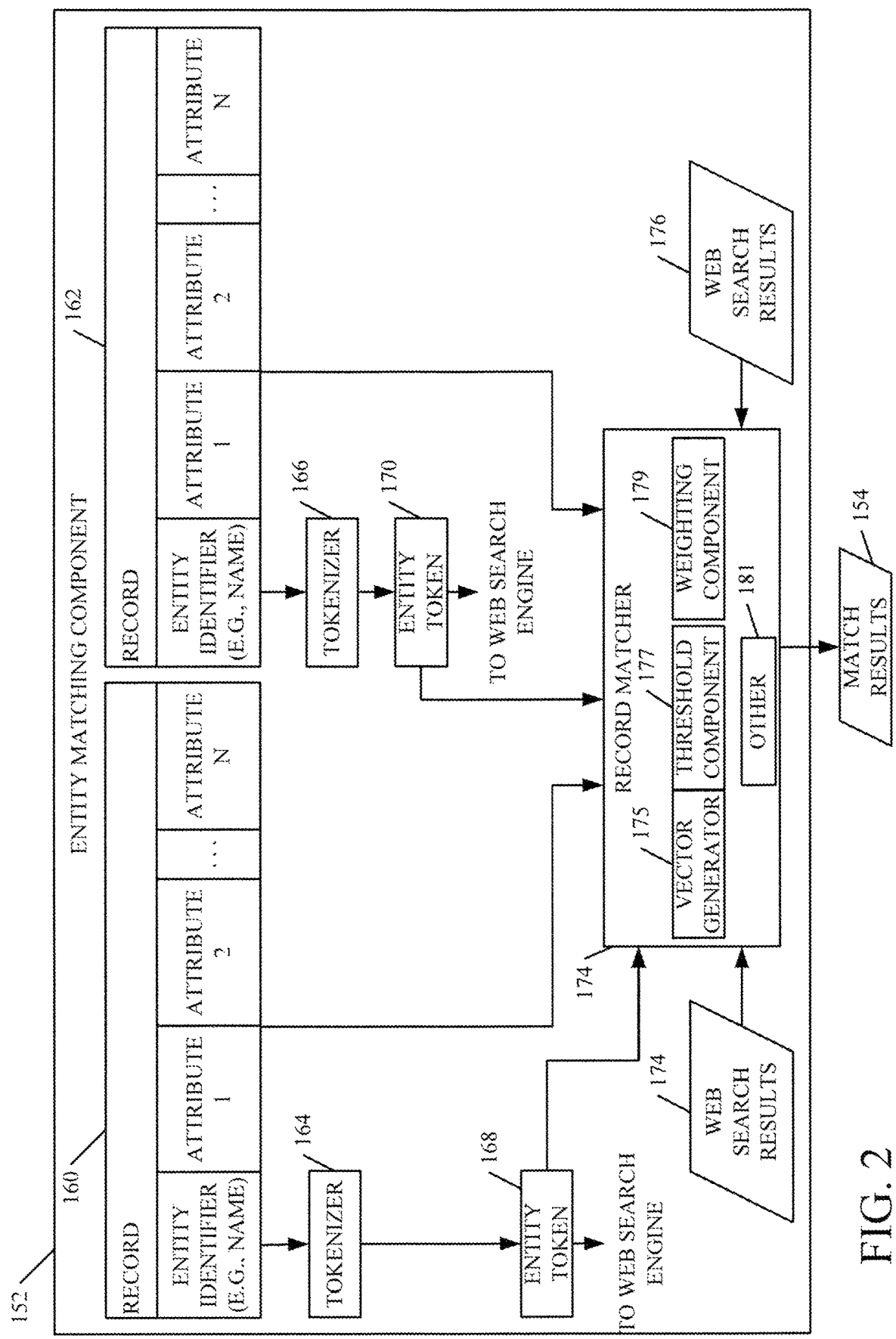
FIG. 2 is a block diagram showing one example of an entity matching system in more detail.

A more detailed description of an entity matching component 152 will now be provided. FIG. 2 shows a block diagram of a more detailed view of one example of an entity matching component 152. It will be appreciated that an instance of entity matching component 152 operates on the records of each block 148. It matches pairs of records in each block. Therefore, FIG. 2 shows that entity matching component 152 has chosen a first record 160 and a second record 162. Entity matching component 152 also includes tokenizers 164 and 166 (which can also be a single tokenizer instead of different tokenizers) which normalize the records 160 and 162 to obtain corresponding entity tokens 168 and 170. Entity matching component 152 also includes record matcher 172 that can operate either on the records 160-162, themselves, or the tokenized (or normalized) records 168-170. Record matcher 172 can include vector generator 175, threshold component 177, weighting component 179, or other items 181. Record matcher 172 can determine, based on the records themselves or the entity tokens, whether the two records match (and actually refer to the same entity, in this example, the same customer). In doing so, record matcher 172 can correlate the matching to already-learned resolutions 140 and can consider structured and unstructured data such as web search results 174-176 that are generated based on each of the entity tokens 168-170. Record matcher 172 illustratively outputs the match results 154 for the pair of records 160-162 that are being processed, to indicate whether they match.

Figure 3A:
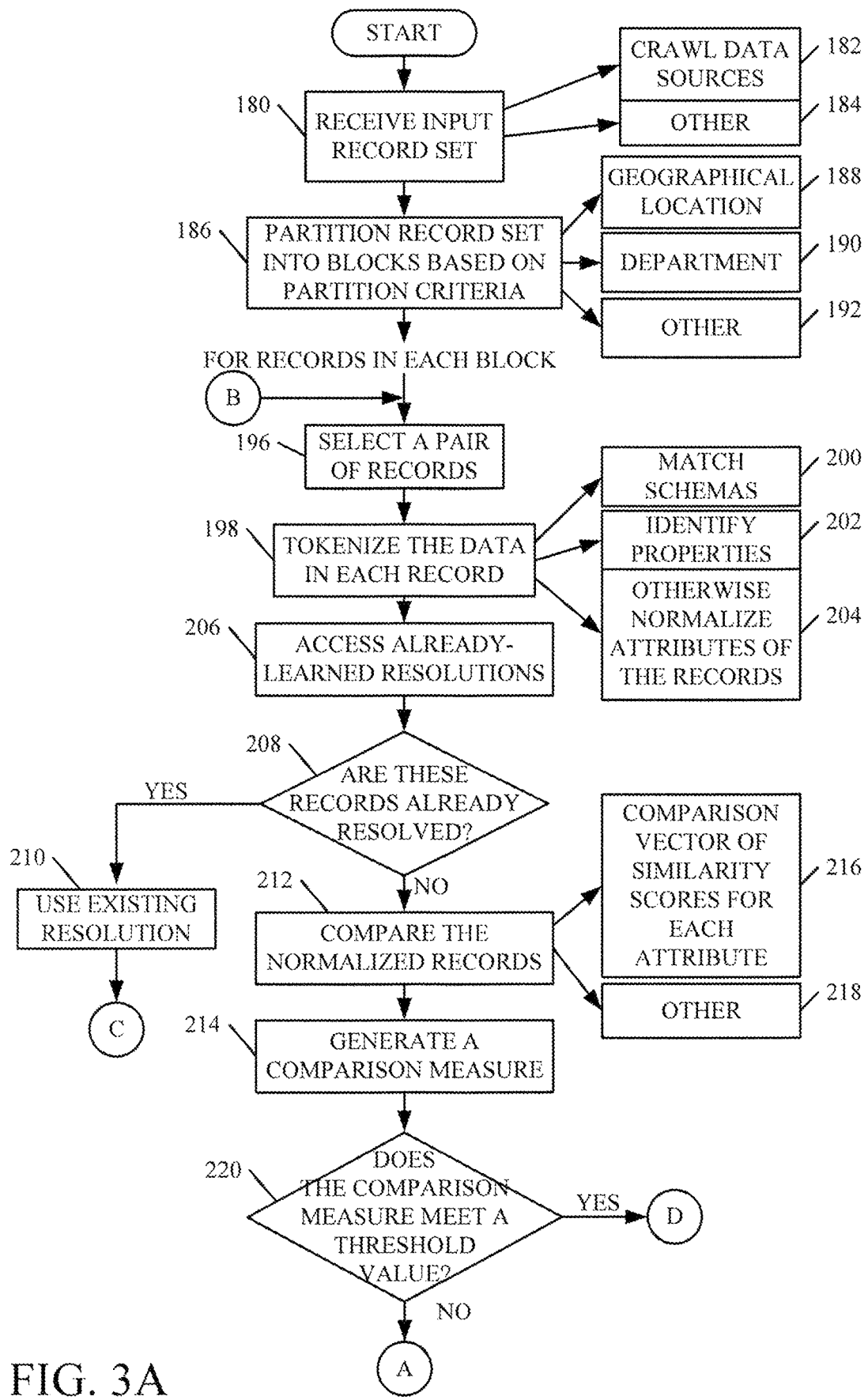
FIGS. 3A and 3B (collectively referred to as FIG. 3) show a flow diagram illustrating one example of the operation of the architecture shown in FIG. 1, and the entity matching system shown in FIG. 2, in matching entity records.
Figure 3B:
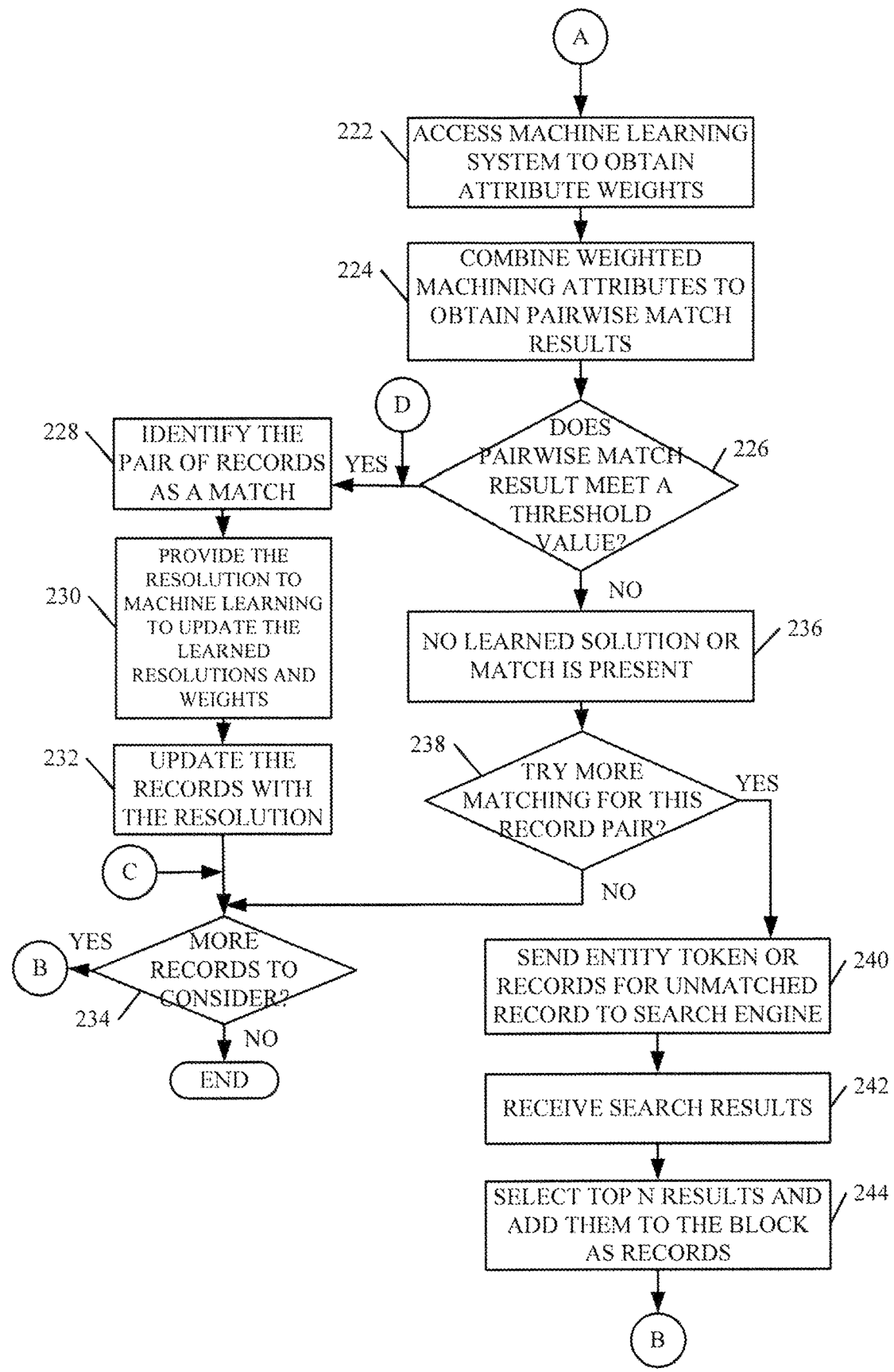

FIGS. 3A and 3B (collectively referred to as FIG. 3) show a flow diagram illustrating one example of the operation of architecture 100 in resolving entities in the input record set 138. Partition component 146 first receives the input record set 138. This is indicated by block 180 in FIG. 3. This can be done in a wide variety of ways. For instance, business system 102, or entity resolution system 104, can include a crawler that intermittently crawls the various systems 122-128 in business system 102 to obtain newly added or revised records. Crawling the data sources to obtain the input record set 138 is indicated by block 182. Of course, the systems 122-128, themselves, can provide the records 138 as well. The records can be obtained in a wide variety of other ways, and this is indicated by block 184.

Partition component 146 then partitions the input record set 138 into blocks based on partition criteria. This is indicated by block 186. For instance, where the records correspond to customers in business system 102, then partition component 146 can partition the input record set 138 based upon the geographic location identified for the customer entity in those records. This may be helpful, because if two customers with relatively similar records are located at the same geographic location, or a very similar one, then the records are likely referring to the same customer. Partitioning the records based on geographical location is indicated by block 188.

However, the records can be partitioned based upon a wide variety of other partitioning criteria as well. For instance, they can be partitioned based upon the department identifier 190 associated with the records. They can be partitioned based on a whole host of other criteria 192, and the particular criteria that are used to partition the record sets may vary based upon application or based upon the type of entity that is being resolved, or for other reasons. For instance, if the entity is a customer entity, the partitioning criteria may be geographical location or other criteria. If the entity is a product entity, then the partitioning criteria may be entirely different.

In any case, partition component 146 partitions the input record set 138 into a set of record blocks 148. Each block 148 illustratively includes a set of records 194.

Each record 160-162 illustratively includes an entity identifier. In the example where the record represents a customer, the entity identifier may be the customer name in the record. Of course, where the record represents a different type of entity, then the entity identifier may be a different identifier, such as a part number, a product name, etc. Each of the records 160-162 also illustratively include a number of different attributes. They are illustrated in FIG. 2 as attributes 1-N. The attributes may also vary based upon the particular type of entity. For instance, if the entity is a customer, then the attributes may include the customer address, primary contact, board of directors, sales figures for the customer, etc. However, if the record is representing a different type of entity, then the attributes may be entirely different.

In one example, the records 194 in each block are then processed through entity resolution system 104, using distributed processing, in parallel. They can be processed synchronously or asynchronously. In such an example, system 104 illustratively launches an instance of entity matching component 152 for each of the different blocks 148. Thus, processing with respect to the remainder of FIG. 3 will be described with respect to a given instance of entity matching component 152 processing records 194 for a given block 148. However, it will be appreciated that the same or similar processing can be performed for the records 194 in each of the other blocks 148 as well.

Entity matching component 152 first selects a pair of records 194 from its corresponding block. This is indicated by block 196 in FIG. 3. The tokenizers 164-166 in entity matching component 152 then normalize the data by generating a normalized token 168-170 for each record. This is indicated by block 198. This can be done in a wide variety of ways. For instance, the tokenizers 164-166 can match the schemas of the records 162 in the corresponding record pair. This is indicated by block 200. If the schemas do not match, then tokenizers 164-166 can scan the record and identify various properties (or attributes) in each of the records 160-162 that fit in a normalized form. For instance, the tokenizer can locate address information in the record and place in an address field of the normalized form. The same can be done for other properties or attributes of the record. This is indicated by block 202. Tokenizers 164-166 can normalize the attributes of the records 160-162 in other ways as well, and this is indicated by block 204.

Once the tokenizers have generated the normalized form of the record (as the entity tokens 168-170), record matcher 172 accesses the learned resolutions 140 that have already been learned by machine learning system 106 (which may be a supervised learning system) to determine whether the corresponding tokens have already been resolved. This is indicated by block 206 in FIG. 3. If so, then record matcher 172 outputs the match results 154 for the records 160-162, using the already-learned resolution. This is indicated by blocks 208 and 210 in FIG. 3.

However, if there is no existing resolution for the two records, then record matcher 172 compares the normalized form of the records (e.g., the entity tokens 168-170) to generate a comparison measure indicative of how similar the two tokens are. This is indicated by blocks 212 and 214 in FIG. 3. In one example, vector generator 175 in record matcher 172 does this by generating a comparison vector of similarity scores for each attribute 1-N in the normalized form. In one example, vector generator 175 compares each corresponding attribute to determine whether it holds an identical value. If it does, then the vector value, corresponding to that attribute, indicates that a match has occurred. If not, the vector value indicates that the attributes do not match. In another example, however, vector generator 175 does not only look for an identical match of a given pair of attributes, but it can determine how similar they are. For instance, if they differ by one letter, one character, or have other slight differences, then vector generator 175 may include a high similarity score as the vector value for that set of attributes. If they vary drastically, then the similarity score may be lower. Record matcher 172 can do this for each pair of corresponding attributes 1-N in the records themselves or in normalized form of the two records 160-162 (e.g., in tokens 168-170) to generate the comparison vector. Generating a comparison vector is indicated by block 216 in FIG. 3. Of course, record matcher 172 can generate a comparison measure indicative of how the various attributes of the two records compare to one another in other ways as well, and this is indicated by block 218.

Threshold component t177 in record matcher 172 then determines whether the comparison measure meets a threshold value. If the threshold component 177 determines that the comparison measure does meet the threshold value, then the two records are identified as a match. This is indicated by block 220 in FIG. 3. If not, however, then weighting component 179 in record matcher 172 accesses machine learning system 106 to obtain attribute weights. This is indicated by block 222. For instance, it may be that some of the attributes are more important than others. In that case, even if all or a majority of the attributes do not match, the matching attributes may outweigh the non-matching attributes. The weights can be learned by machine learning system 106, and revised over time. Therefore, in one example, weighting component 179 obtains the latest attribute weights from machine learning system 106 and combines the weighted matching attributes to obtain a pairwise match result indicative of the combination of weighted attribute matches. This is indicated by block 224.

Again, threshold component 177 determines whether the pairwise match result meets a threshold value. This is indicated by block 226. If so, then record matcher 172 identifies the two records as matching. This is indicated by block 228. It provides the match to machine learning system 106 so that machine learning system 106 can update the learned resolutions 140. This is indicated by block 230 in FIG. 3. It also provides the match results to record update component 108 which updates records 110 with the resolved match. This is indicated by block 232. Entity matching component 152 then determines whether there are more records to consider in its corresponding block 148. This is indicated by block 234. If so, processing reverts to block 196 where another pair of records is selected from the block.

If, at block 226, threshold component 177 determines that the two records do not match, even with the weighted attributes, then record matcher 172 determines that there has been no learned resolution or match for these two records. This is indicated by block 236. It then determines whether additional matching is to be conducted for this pair of records. This is indicated by block 238. This can be done in a wide variety of different ways. For instance, if additional web result matching has not been performed yet, then this may be desired. However, if a fairly exhaustive matching operation has already been performed, then it may be that no further matching is desired, and processing again continues at block 234.

Assuming, at block 238, that additional matching is to be attempted, then record matcher 174 sends the entity tokens 168-170 (or a subset of those tokens or the raw records 160-162) to search engine 112. Search engine 112 uses these items to perform a search against a variety of different kinds of web content 114. Sending the entity token or records corresponding to an unmatched record to the search engine 112 is indicated by block 240 in FIG. 3. Search engine 112 returns the results of the search, and receiving those results at entity matching component 152 is indicated by block 242. Record matcher 172 selects the top N results as additional records in its corresponding block. The number N can be preset, fixed or dynamic. It can be determined empirically, heuristically or otherwise. It can vary based on entity type or based on other information. Record matcher 172 then adds the top N results to the block for further processing. This is indicated by block 244. Processing then reverts to block 196 where another pair of records from the block are selected for processing. In this way, the web results are treated just the same as the other records 194 in the record block corresponding to this instance of the entity matching component 152. Therefore, they are selected, normalized, and matched against one another as described above.

It can thus be seen that the entity resolution system 104 brings together a variety of different approaches for performing entity resolution, and augments them with web result metadata and machine learning approaches. It can use distributed processing (such as map reduce jobs) with record linking to link records referring to the same entity. It can incorporate both structured and unstructured data, as well as web search results. It allows customers to easily surface valuable information to gain various insights across all phases of an implementation lifecycle for a given customer or other entity, and it enables informed customer management decisions and more predictable and successful implementations of software systems (such as business software systems).

Because two different entities, used in two different contexts, can include valuable, cross-context, information, it can be highly beneficial to resolve the two different entities as identifying the same real world item. Obtaining a single customer view, for instance, results in improved knowledge of customer behaviors, and can be used to improve customer relationships. It can also be used to improve customer retention in cross-selling activities. It also improves the performance of the system itself. For instance, it surfaces a more comprehensive view of a single entity, more quickly. This results in more efficient processing, thus reducing the processing overhead on the system. A user may not need to search multiple different systems, within a business system, in order to obtain a comprehensive view of an entity. Instead, that entity can be already generated so that, when a user pulls up the relevant entity, the comprehensive view is provided, instead of a partial view that may be provided by any of the individual systems.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
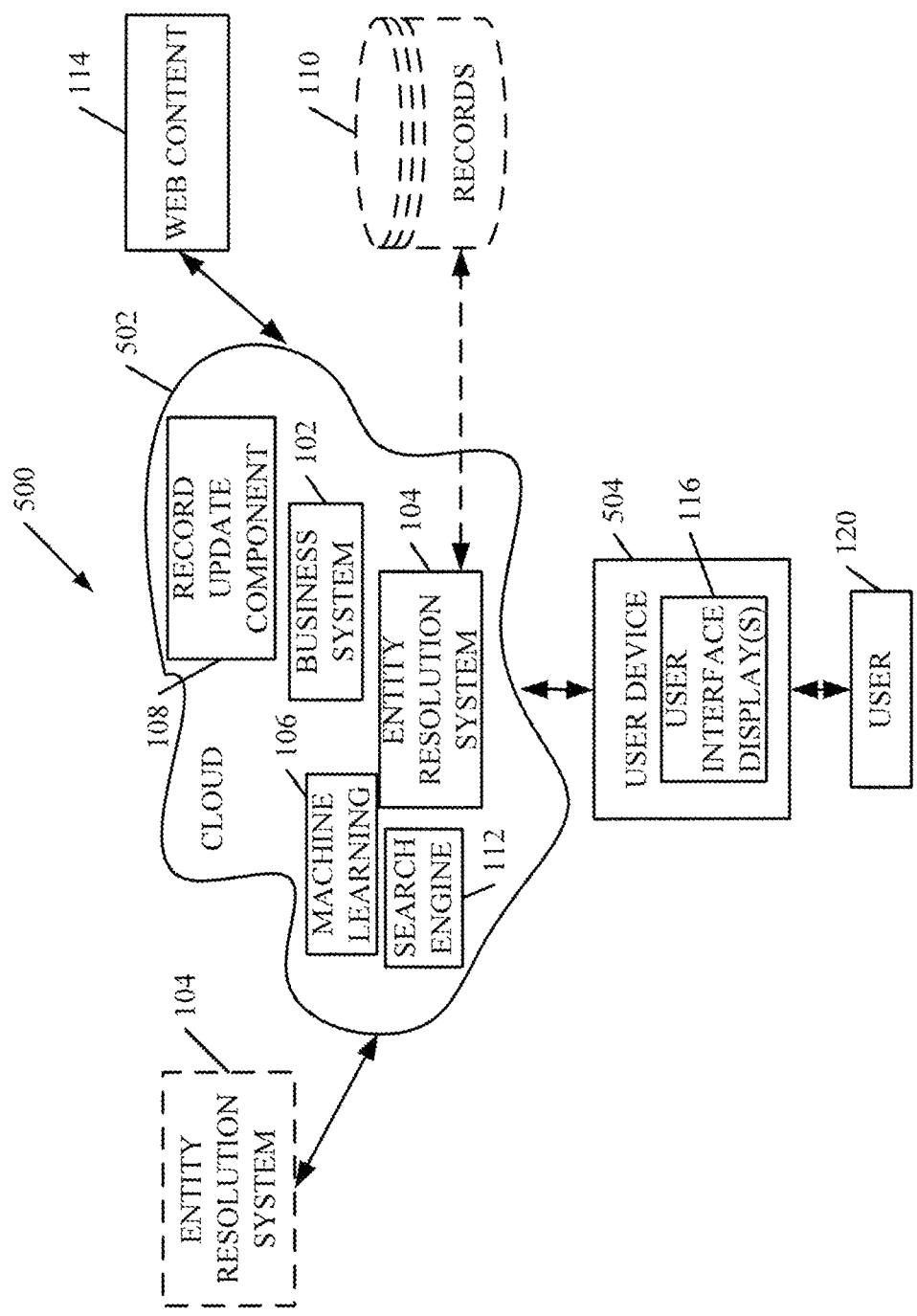
FIG. 4 is a block diagram showing one example of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that systems 102, 104, 106, 108 and 112 can be located in cloud 502 (which can be public, private, or a combination where portions are public while others are private). Therefore, user 120 uses a user device 504 to access those systems through cloud 502.

FIG. 4 also depicts another example of a cloud architecture. FIG. 4 shows that it is also contemplated that some elements of architecture 100 are disposed in cloud 502 while others are not. By way of example, the data store that holds records 110 can be disposed outside of cloud 502, and accessed through cloud 502. In another example, entity resolution system can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
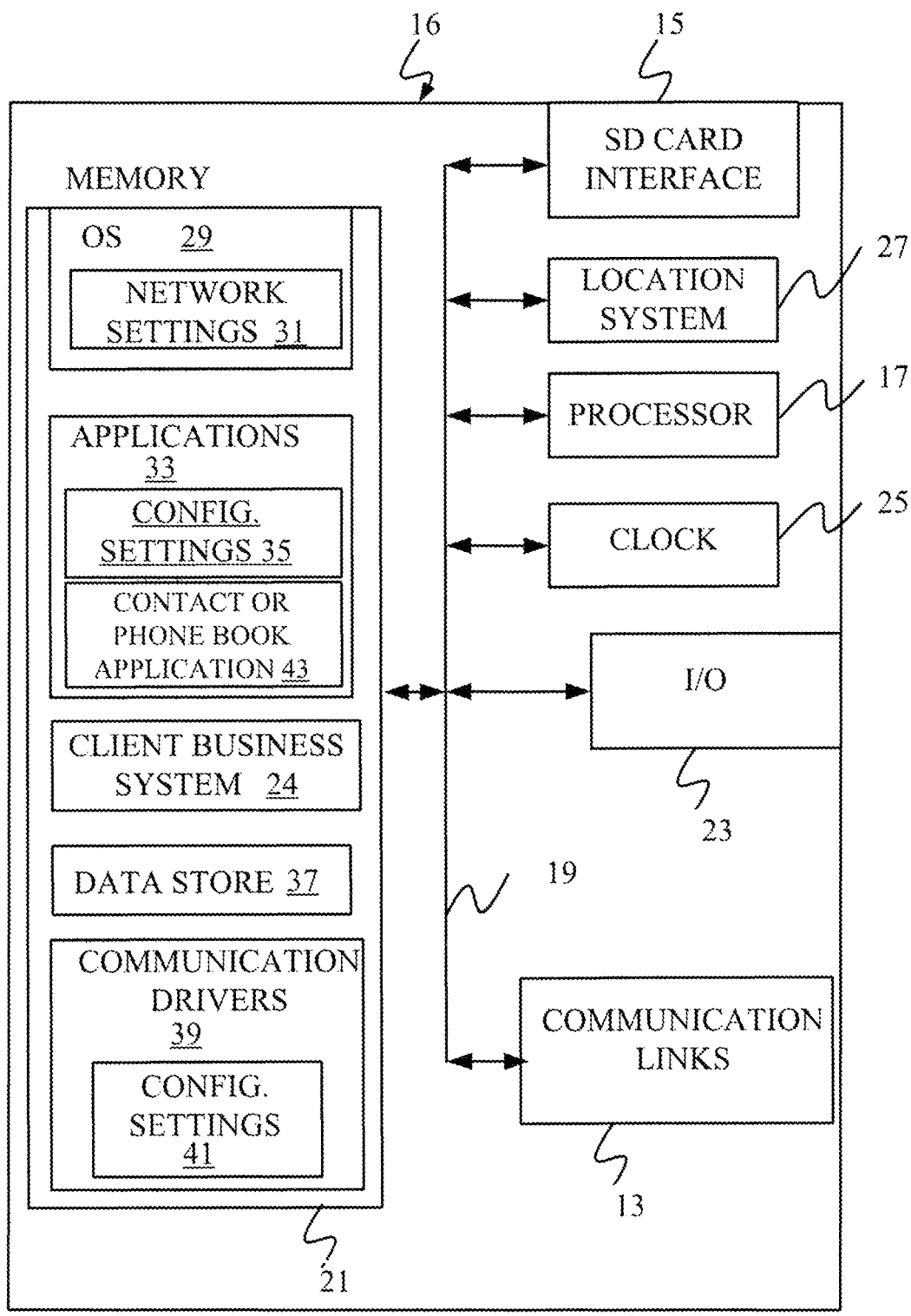
FIGS. 5-7 show various examples of mobile devices.
Figure 6:
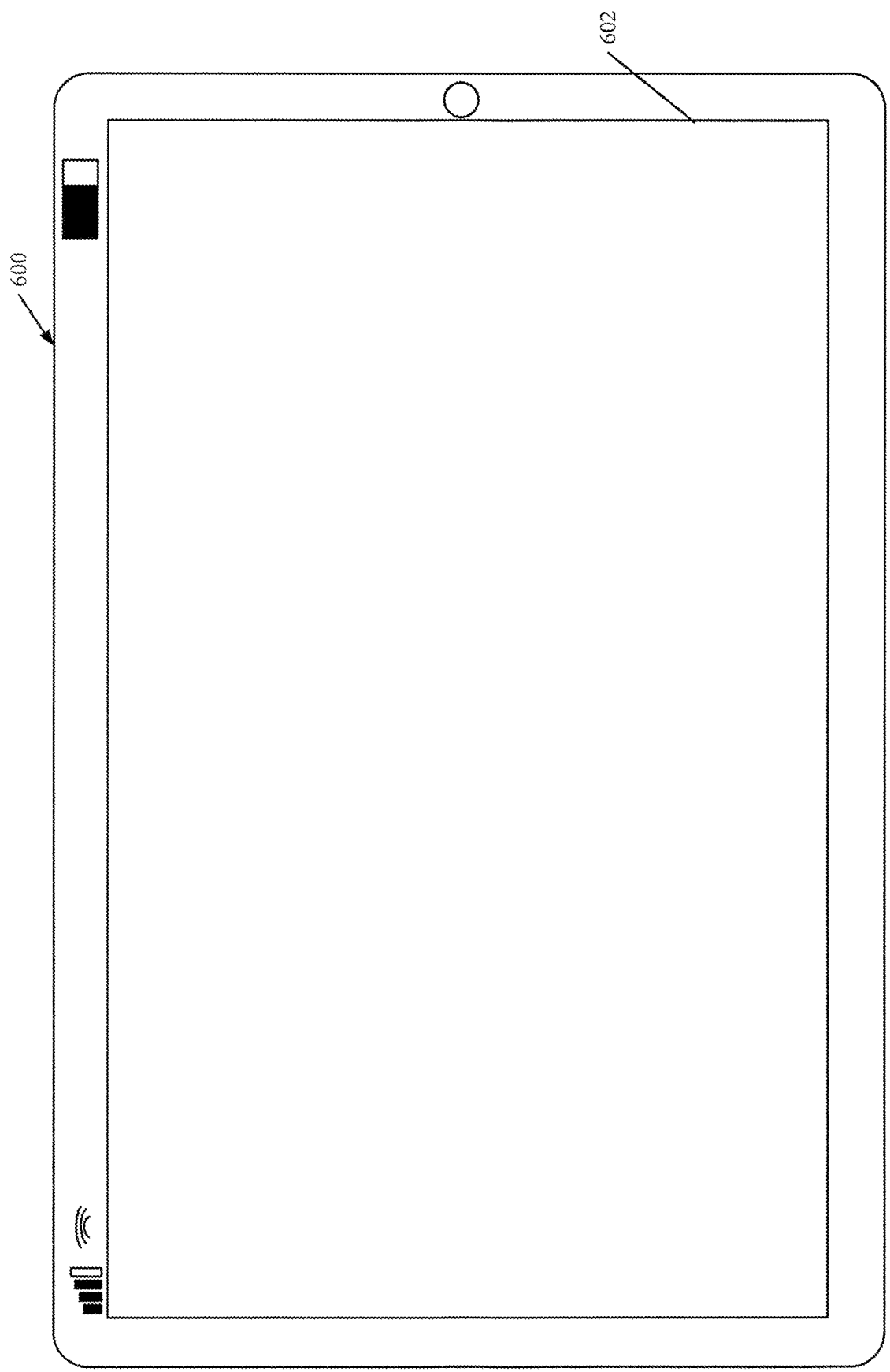
Figure 7:
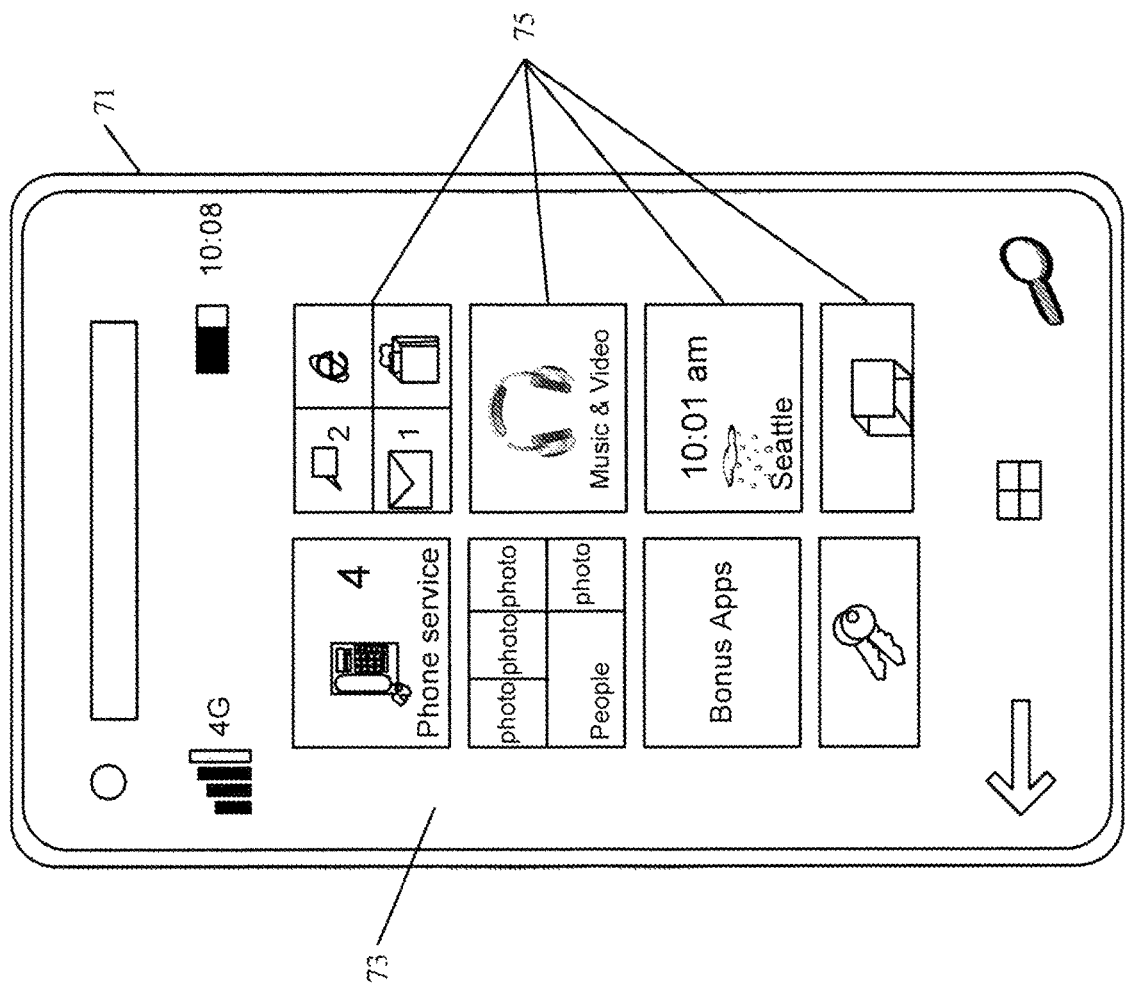

FIG. 5 is a simplified block diagram of one illustrative embodiment of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors or servers 140, or 147 from FIG. 1 or those in device 504) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone also includes a Secure Digital (SD) card slot that accepts a SD card.

The mobile device can also be a personal digital assistant (PDA) or a multimedia player or a tablet computing device, etc. (hereinafter referred to as PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
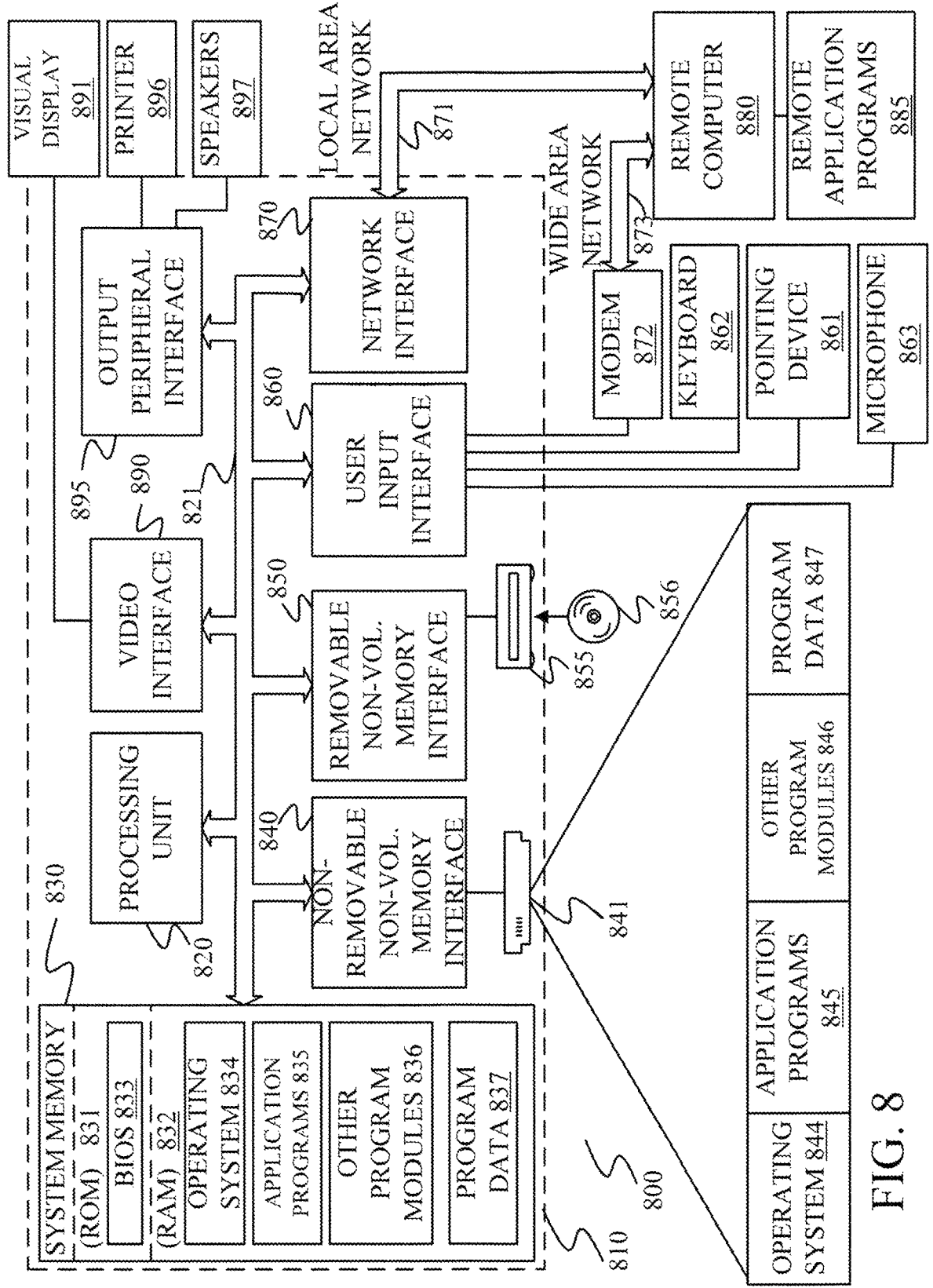
FIG. 8 is a block diagram of one example of a computing environment.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processors or servers 140 or those in device 504), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a record tokenizer that receives first and second records, each record including an item identifier that identifies an item that is a subject of the record and a set of attributes, the tokenizer normalizing the first and second records to obtain corresponding first and second entity tokens, each entity token representing the item identifier and attributes in the corresponding record in a normalized form; and a record matcher that compares the first entity token to the second entity token to identify a similarity measure and provide a match result indicative of whether the first and second records resolve to a same item as their subject, based on the similarity measure.

Example 2 is the computing system of any or all previous examples and further comprising:

a record update component that receives the match result and updates a record of items based on the match result.

Example 3 is the computing system of any or all previous examples wherein the update component is configured to, in response to the match result indicating that the first and second records resolve to the same item, aggregate a superset of the attributes in the first and second records and update the same item in the record of items based on the superset of attributes.

Example 4 is the computing system of any or all previous examples wherein the record matcher accesses a set of previously learned resolutions to identify whether a previously learned resolution indicates that the first and second entity tokens resolve to the same item.

Example 5 is the computing system of any or all previous examples and further comprising:

a supervised machine learning system that provides the set of previously learned resolutions.

Example 6 is the computing system of any or all previous examples wherein the record matcher is configured to provide the match result to the supervised machine learning system to update the previously learned resolutions.

Example 7 is the computing system of any or all previous examples wherein the record matcher is configured to select the first and second records from a record block and, in response to the match result indicating that the first and second records do not resolve to the same item, access a wide area network search engine to launch a wide area network search, using the first entity token as a search input, and obtain search results, the search results being added to the record block as records to be tokenized by the tokenizer and compared using the record matcher.

Example 8 is the computing system of any or all previous examples and further comprising:

a partition component that receives an input record set and that partitions the input record set into blocks based on partitioning criteria.

Example 9 is the computing system of any or all previous examples wherein the partition component partitions the input record set into the blocks based on geographic location information contained in each record in the input record set.

Example 10 is the computing system of any or all previous examples wherein the record matcher comprises:

a vector generator that generates a similarity vector with vector values corresponding to each attribute in the normalized form, the vector values being indicative of whether the corresponding attributes in the first and second entity tokens match one another, the similarity measure being based on the vector values.

Example 11 is the computing system of any or all previous examples wherein the record matcher comprises:

a threshold component that identifies whether the similarity measure meets a threshold value and, if so, provides the match result to indicate that the first and second records resolve to the same item.

Example 12 is the computing system of any or all previous examples wherein the record matcher comprises:

a weighting component that identifies weights for each vector value and generates the similarity measure based on a weighted combination of the vector values.

Example 13 is the computing system of any or all previous examples and further comprising:

a plurality of different business subsystems, each having a record set, the record sets from the plurality of different business subsystems comprising the input record set.

Example 14 is a method, comprising:

obtaining an input record set from a plurality of different data sources, the record set including a plurality of different records, each record including an item identifier that identifies an item that is described by the record and a set of attributes that relate to the item, the records being in different forms;

normalizing the plurality of different records into corresponding normalized forms;

comparing the normalized forms to generate a match result indicative of whether the plurality of different records describe a same item;

updating a record store based on the match result.

Example 15 is the method of any or all previous examples wherein comparing further comprises:

accessing a set of previously learned matches, learned by a supervised machine learning system;

determining whether the set of previously learned matches includes a match result for the plurality of different records corresponding to the normalized forms compared.

Example 16 is the method of claim 14 and further comprising:

if the match result indicates that the plurality of different records do not describe the same item, then launching a web search using at least a part of at least one of the normalized forms;

receiving search results; and adding at least some of the search results to the input record set for normalizing and comparing.

Example 17 is the method of any or all previous examples wherein obtaining the input record set comprises:

obtaining the input record set from a plurality of different subsystems in a business system.

Example 18 is the method of any or all previous examples wherein comparing comprises:

identifying a similarity of the attributes in the normalized forms corresponding to two of the records;

generating a similarity vector having vector values corresponding to the attributes, the vector values being indicative of the similarity of the corresponding attributes;

generating a similarity measure based on the vector values; and generating the match result based on the similarity measure.

Example 19 is an entity resolution system, comprising:

a partition component that receives an input record set that includes records from a plurality of different data sources and partitions the input record set into blocks based on partition criteria, each record relating to an entity; and an entity matching component that selects first and second records from a given block, and outputs a match result indicative of whether the first and second records resolve to a same entity, wherein the entity matching component normalizes the records into corresponding normalized forms, determines whether previously learned resolutions are found for the normalized forms corresponding to the first and second records and, if not, compares the normalized forms to determine whether they meet a similarity threshold and, if not, uses at least a portion of at least one normalized form to generate a web search and obtain search results, the entity matching component adding at least some of the search results to the given block for later selection by the entity matching component.

Example 20 is the entity resolution system of any or all previous examples wherein the first and second records contain attributes, and further comprising:

a record update component that updates an entity record with the attributes from the first and second records in response to the match result indicating that the first and second records resolve to the same entity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory including instructions that, when executed by the at least one processor, cause the computing system to:
   receive a first record including a first item identifier and a first set of attributes;
   obtain a corresponding first entity token that corresponds to the first record and represents normalization of the first item identifier and the first set of attributes;
   receive a second record including a second item identifier and a second set of attributes;
   obtain a corresponding second entity token that corresponds to the second record and is different than the corresponding first entity token that corresponds to the first record, the second entity token representing normalization of the second item identifier and the second set of attributes;

generate a set of attribute similarity measures, each attribute similarity measure corresponding to a given attribute in the first set of attributes and representing a similarity of the given attribute to an attribute in the second set of attributes;

obtain a set of attribute weights generated by a machine learning system based on prior match record results, each attribute weight indicating a weight of a corresponding attribute relative to other attributes;

for each particular attribute similarity measure in the set of attribute similarity measures, identify an attribute weight in the set of attribute weights that corresponds to the given attribute corresponding to the particular attribute similarity measure;

generate a token similarity measure based on a weighted combination of attribute similarity measures in the set of attribute similarity measures;

based on the token similarity measure, determine a match result indicative of whether the first and second records resolve to a same item;

based on the match result indicating that the first and second records do not resolve to the same item, obtain a search result based on at least one of the corresponding first entity token or the corresponding second entity token; and add the search result as a record to be processed by the computing system.

2. The computing system of claim 1 wherein the instructions cause the computing system to:
update a record of items based on the match result.

3. The computing system of claim 2 wherein the instructions cause the computing system to:
in response to the match result indicating that the first and second records resolve to the same item, aggregate a superset of attributes in the first and second records and update the same item in the record of items based on the superset of attributes.

4. The computing system of claim 3 wherein the instructions cause the computing system to:
access a set of previously learned resolutions to identify whether a previously learned resolution indicates that the first and second entity tokens resolve to the same item.

5. The computing system of claim 4 wherein the machine learning system comprises a supervised machine learning system configured to provide the set of previously learned resolutions.

6. The computing system of claim 5 wherein the instructions cause the computing system to provide the match result to the supervised machine learning system to update the previously learned resolutions.

7. The computing system of claim 1 wherein the instructions cause the computing system to:
receive an input record set and partition the input record set into blocks based on partitioning criteria.

8. The computing system of claim 7 wherein the instructions cause the computing system to:
partition the input record set into blocks based on geographic location information contained in each record in the input record set.

9. The computing system of claim 8 wherein the instructions provide:
a plurality of different business subsystems, each having a record set, the record sets from the plurality of different business subsystems comprising the input record set.

10. The computing system of claim 1 wherein the first record includes a first attribute of a subject of the first record and the second record includes a second attribute of a subject of the second record.

11. The computing system of claim 10 wherein the instructions cause the computing system to:
generate a similarity vector with a vector value corresponding to the first and second attributes in a normalized form, the vector value being indicative of whether the first attribute matches the second attribute.

12. The computing system of claim 11 wherein the similarity vector indicates a similarity of the first attribute and the second attribute, and the instructions cause the computing system to:
determine that the similarity vector meets a threshold value; and
based on the determination, provide the match result to indicate that the first and second records resolve to the same item.

13. The computing system of claim 11, wherein the instructions cause the computing system to:
generate the similarity vector with vector values representing the set of attribute similarity measures;
determine that the similarity vector meets a threshold value; and
based on the determination, provide the match result to indicate that the first and second records resolve to the same item.

14. A computer-implemented method comprising:
receiving a first record including a first item identifier and a first set of attributes;
obtaining a corresponding first entity token that corresponds to the first record and represents normalization of the first item identifier and the first set of attributes;
receiving a second record including a second item identifier and a second set of attributes;
obtaining a corresponding second entity token that corresponds to the second record and is different than the corresponding first entity token that corresponds to the first record, the second entity token representing normalization of the second item identifier and the second set of attribute;
generating a set of attribute similarity measures, each attribute similarity measure corresponding to a given attribute in the first set of attributes and representing a similarity of the given attribute to an attribute in the second set of attributes;
obtaining a set of attribute weights generated by a machine learning system based on prior match record results, each attribute weight indicating a weight of a corresponding attribute relative to other attributes;
for each particular attribute similarity measure in the set of attribute similarity measures, identifying an attribute weight in the set of attribute weights that corresponds to the given attribute corresponding to the particular attribute similarity measure;
generating a token similarity measure based on a weighted combination of attribute similarity measures in the set of attribute similarity measures;
based on the token similarity measure, determining a match result indicative of whether the first and second records resolve to a same item;
based on the match result indicating that the first and second records do not resolve to the same item, obtaining a search result based on at least one of the corresponding first entity token or the corresponding second entity token; and adding the search result as a record to be processed by the computing system.

15. The computer-implemented method 14, wherein the first record includes a first attribute of a subject of the first record and the second record includes a second attribute of a subject of the second record, and further comprising:
   generating a similarity vector with a vector value corresponding to the first and second attributes in a normalized form, the vector value being indicative of whether the first attribute matches the second attribute.

16. The computer-implemented method 15, wherein the similarity vector indicates a similarity of the first attribute and the second attribute, and further comprising:
   determining that the similarity vector meets a threshold value; and
   based on the determination, providing the match result to indicate that the first and second records resolve to the same item.

17. The computer-implemented method 15, and further comprising:
   generating the similarity vector with vector values representing the set of attribute similarity measures;
   determining that the similarity vector meets a threshold value; and
   based on the determination, providing the match result to indicate that the first and second records resolve to the same item.

18. A method performed by a computing system, the method comprising:
   receiving a first record including a first item identifier, that identifies a subject of the first record, and a first set of attributes;
   obtaining a corresponding first entity token that corresponds to the first record and represents normalization of the first item identifier and the first set of attributes;
   receiving a second record including a second item identifier, that identifies a subject of the second record, and a second set of attributes;
   obtaining a corresponding second entity token that corresponds to the second record and is different than the corresponding first entity token that corresponds to the first record, the second entity token representing normalization of the second item identifier and the second set of attributes;
   generating a similarity vector with a set of vector values, each vector value a given attribute in the first set of attributes and representing a similarity of the given attribute to an attribute in the second set of attributes;
   obtaining a set of attribute weights generated by a machine learning system based on prior match record results, each attribute weight indicating a weight of a corresponding attribute relative to other attributes;
   for each vector value in the set of vector values, identifying an attribute weight in the set of attribute weights that corresponds to the given attribute corresponding to the vector value;
   generating a token similarity measure based on a weighted combination of vector values;
   based on determining that the token similarity measure meets a threshold value, generating a match result indicating that the first and second records resolve to the same item; and
   based on the match result, updating the set of attribute weights generated by the machine learning system.

* * * * *